US008667442B1

(12) United States Patent
Tian et al.

(10) Patent No.: US 8,667,442 B1
(45) Date of Patent: Mar. 4, 2014

(54) CIRCUIT SIMULATION METHODOLOGY TO CALCULATE LEAKAGE CURRENT DURING ANY MODE OF CIRCUIT OPERATION (75) Inventors: Wei M. Tian, San Jose, CA (US);
An-Chang Deng, Saratoga, CA (US);
Che-Cheng Lin, Cupertino, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 0 days.

(21) Appl. No.: 13/523,786

(22) Filed: Jun. 14, 2012

(51) Int. Cl.
*G06F 17/50* (2006.01)
(52) U.S. Cl.
USPC .............. 716/115; 716/111; 716/113
(58) Field of Classification Search
USPC ......................... 716/111, 113, 115
See application file for complete search history.

(56) References Cited

U.S. PATENT DOCUMENTS

| 5,606,518 | A   | * | 2/1997  | Fang et al. ............... 703/13 |
| 2002/0060584 | A1 | * | 5/2002  | Okuda .................... 324/765 |
| 2004/0021501 | A1 | * | 2/2004  | Das et al. ................ 327/534 |
| 2005/0149887 | A1 | * | 7/2005  | Chatterjee et al. ......... 716/2 |
| 2007/0159239 | A1 | * | 7/2007  | Rhee ..................... 327/544 |
| 2007/0245285 | A1 | * | 10/2007 | Wang et al. .............. 716/10 |
| 2010/0017763 | A1 | * | 1/2010  | Kim et al. ................ 716/4 |

FOREIGN PATENT DOCUMENTS

JP          02006119101 A  *  5/2006  ........... G01R 31/319

* cited by examiner

*Primary Examiner* — Vuthe Siek
(74) *Attorney, Agent, or Firm* — Vista IP Law Group, LLP (57) ABSTRACT

A method for calculating leakage current associated with an integrated circuit, includes selecting a sampling point at which an input signal for the integrated circuit is in a quiescent state and determining the leakage current associated with the integrated circuit using the selected sampling point.

35 Claims, 6 Drawing Sheets

CIRCUIT SIMULATION METHODOLOGY TO CALCULATE LEAKAGE CURRENT DURING ANY MODE OF CIRCUIT OPERATION

FIELD OF THE INVENTION

The invention relates to the field of leakage current calculation, and in particular to a novel circuit simulation methodology to calculate leakage current during any mode of circuit operation.

BACKGROUND

The demand for smaller and more efficient electronic devices has led to the continued scaling of CMOS technologies with respect to both device dimensions and supply voltages. In order to meet these design constraints while retaining high performance characteristics (e.g., overcoming various short channel effects), CMOS circuits are often required to have ultra-low gate oxide thicknesses and consequently ultra-low threshold voltages. Such devices have a greater susceptibility to significant leakage due to various device effects. Some of these effects result in significant leakage current/power during standby mode operation of the device, while other effects result in significant leakage current/power during active mode operation of the device. All of these factors have made it critical for circuit designers to evaluate and optimize leakage current/power in both standby and active modes of operation.

Because leakage current amplitude typically has a magnitude in the nA or pA range, simulation of leakage current/power in electronic design automation (EDA) tools is required to be highly accurate. Current approaches for simulating leakage current for a given circuit require the circuit to reach a quiescent state before an accurate measurement of leakage current/power can be determined. Additionally, users are required to estimate the time needed for the circuit to reach a quiescent state in order for an accurate measurement of leakage current/power can be determined.

These approaches suffer from several disadvantages. Because the circuit is required to reach a quiescent state in order for an accurate measurement of leakage current/power to be determined, a substantially long transient simulation is often required. Additionally, requiring the user to estimate the time needed for the circuit to reach a quiescent state is often unreliable and can result in inaccurate simulation results or unnecessarily long transient simulation times. Because of the lack of predictability in estimating the time needed for a circuit to reach a quiescent state, it becomes very difficult to accurately measure leakage current/power, especially when the circuit is operating in an active mode.

SUMMARY

The present invention is directed to a method, system, and computer program product for calculating leakage current associated with an integrated circuit. According to some embodiments, the present approach may involve selecting a sampling point at which an input signal for the integrated circuit is in a quiescent state and determining the leakage current associated with the integrated circuit using the selected sampling point.

Other additional objects, features, and advantages of the invention are described in the detailed description, figures and claims.

BRIEF DESCRIPTION OF THE DRAWINGS

The drawings illustrate the design and utility of embodiments, in which similar elements are referred by common reference numerals. These drawings are not necessarily drawn to scale. In order to better appreciate how the above-recited and other advantages and objects are obtained, a more particular description of the embodiments will be rendered, which are illustrated in the accompanying drawings. These drawings depict only typical embodiments and are not therefore to be considered limiting of the scope of the claims.

DETAILED DESCRIPTION

Various embodiments are described hereinafter with reference to the figures. It should be noted that the figures are not necessarily drawn to scale. It should be noted that the figures are only intended to facilitate the description of the embodiments, and are not intended as an exhaustive description of the invention or as a limitation on the scope of the invention. In addition, an illustrated embodiment need not have all the aspects or advantages shown. An aspect or an advantage described in conjunction with a particular embodiment is not necessarily limited to that embodiment and can be practiced in any other embodiments even if not so illustrated. Also, reference throughout this specification to "some embodiments" or "other embodiments" means that a particular feature, structure, material, or characteristic described in connection with the embodiments is included in at least one embodiment. Thus, the appearances of the phrase "in some embodiment" or "in other embodiments" in various places throughout this specification are not necessarily referring to the same embodiment or embodiments. Moreover, references to "integrated circuit" may also refer to an integrated circuit design.

According to some embodiments, a method is provided for calculating leakage current associated with an integrated circuit by selecting a sampling point at which an input signal for the integrated circuit is in a quiescent state. The selected sampling point is then used to determine the leakage current. In this way, embodiments of the invention allow for leakage current to be calculated without having to perform a long transient simulation or having to estimate a time window for which an output signal associated with the integrated circuit will reach a quiescent state.

Conventional approaches for calculating leakage current for integrated circuits involve long transient simulations and inaccurate timing window estimations. Typically, an integrated circuit is provided an input signal that represents one or more modes of operation of interest. A transient simulation is then performed on the integrated circuit using the input signal and other circuit parameters to model an output signal of the integrated circuit for the different modes of operation. After the output signal associated with the integrated circuit reaches a quiescent state (e.g., steady state) for a particular mode of operation, the leakage current of the integrated circuit may be determined for that mode of operation.

One drawback to such conventional approaches is that a substantially long transient simulation must be performed in order for the output signal of the integrated circuit to reach a quiescent state at which point leakage current may be determined. An accurate determination of leakage current for a mode of operation cannot be made until the output signal of the integrated circuit has reached a quiescent state for that mode of operation. An additional drawback is that a user is often required to estimate the time needed for the output signal of the circuit to reach a quiescent state for a particular mode of operation. Such estimations are unreliable and often result in inaccurate simulation results or unnecessarily long transient simulation times.

Figure 1A:
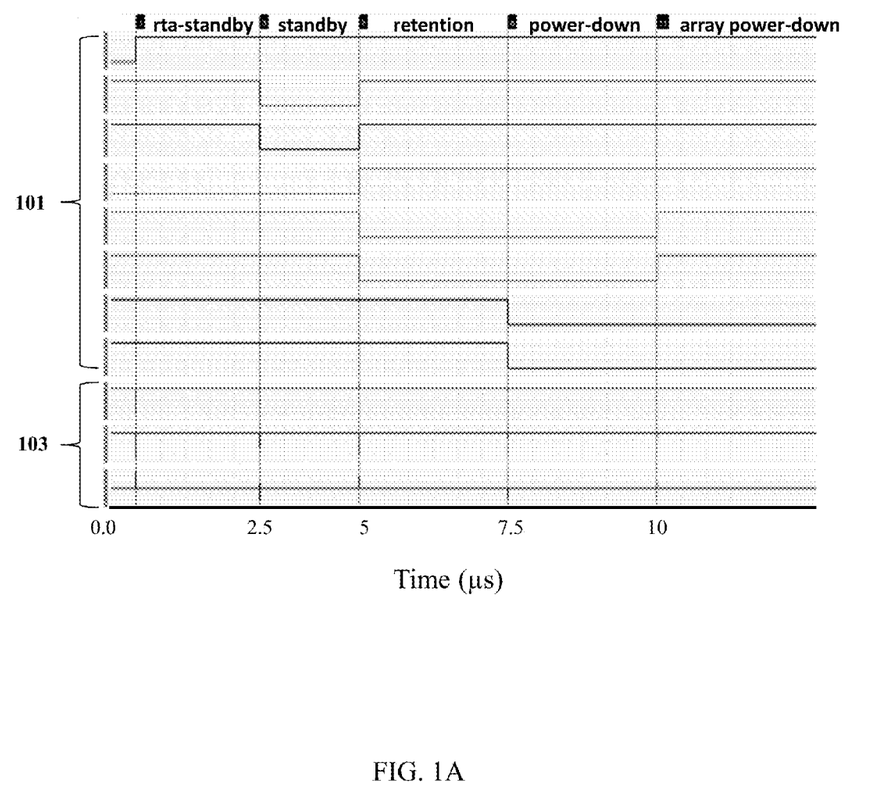
FIG. 1A illustrates various input signals and output signals associated with an integrated circuit.

FIG. 1A illustrates various input signals and output signals associated with an integrated circuit. The first 8 signals are input signals 101 and the last 3 signals are output signals 103. Each input signal represents various modes of operation of interest (e.g., rta-standby, standby, retention, power-down, array power-down) and may correspond to different components of the integrated circuit. A transient simulation is then performed on the integrated circuit using the input signals and other circuit parameters to model output signals for the integrated circuit for the different modes of operation. The output signals may then be used to determine leakage current for a mode of operation of interest once the output signals reach a quiescent state for that mode of operation.

Figure 1B:
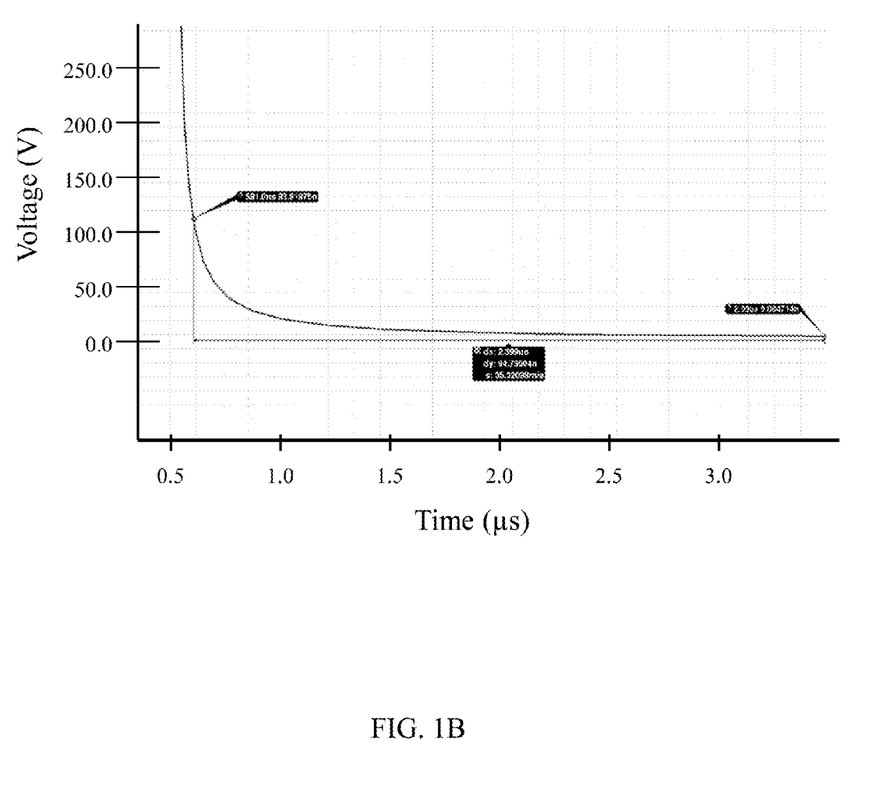
FIG. 1B a more detailed view of an output signal from FIG. 1A.

FIG. 1B illustrates a more detailed view of an output signal from FIG. 1A. The output signal in FIG. 1B corresponds to input signals that represent a standby mode of operation. As illustrated, the output signal takes a significant amount of time before reaching a quiescent state (e.g., steady state) where it can be used to determine the leakage current for the standby mode of operation. When a conventional approach is taken to determine leakage current for the integrated circuit, a long transient simulation is required for the output signal to reach a quiescent state where leakage current can be determined, as described above. This limitation is compounded by the unreliability of requiring the user to estimate the time needed for the output signal of the circuit to reach a quiescent state.

Figure 2:
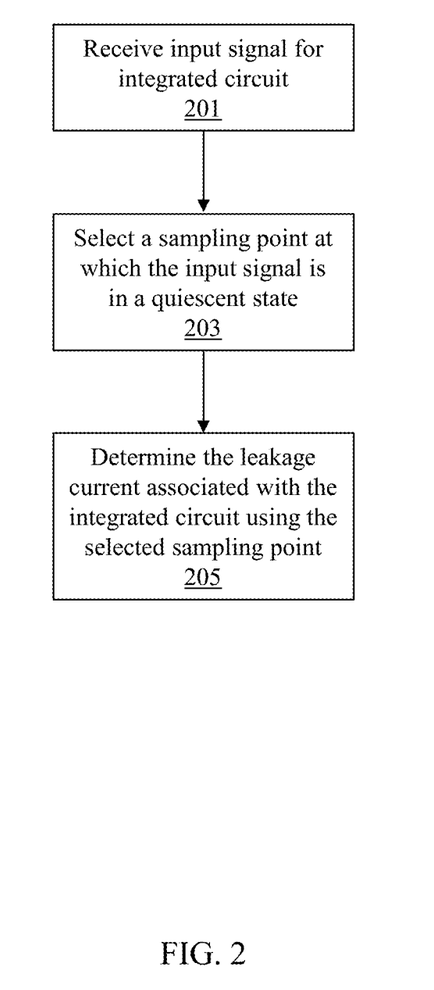
FIG. 2 is a flowchart illustrating a method for calculating leakage current associated with an integrated circuit in accordance with some embodiments.

FIG. 2 is a flowchart illustrating a method for calculating leakage current associated with an integrated circuit in accordance with some embodiments. An input signal for the integrated circuit is received as described at 201. In some embodiments, a single input signal associated with the integrated circuit may be received. In other embodiments, a plurality of input signals associated with the integrated circuit may be received, wherein each input signal corresponds to a different component of the integrated circuit.

In some embodiments, the input signal may represent a single mode of operation while in other embodiments, the input signal may represent more than one mode of operation. For example, the input signals in FIG. 1A each represent five different modes of operation. The input signal may represent various modes of operation such as, for example, an rta-standy mode, a standby mode, a retention mode, a power-down mode, or an array power-down mode.

For purposes of example, the following description will be made with respect to a single input signal representing a single mode of operation. However, one ordinarily skilled in the art will recognize that the method for calculating leakage current may be extended to encompass an integrated circuit with any number of input signals representing any number of modes of operation.

A sampling point at which the input signal is in a quiescent state is then selected as described at 203. Because the input signal is fixed, the quiescent state of the input signal may be easily ascertained once the input signal is known. This is in contrast to determining the quiescent state of an output signal, as the output signal is not fixed and exhibits variation in response to the input signal. In some embodiments, the sampling point may be the first point in time at which the input signal reaches a quiescent state. In other embodiments, the sampling point may be any point in time after the input signal reaches a quiescent state. Additionally, in other embodiments, the sampling point may be a combination of any number of points after the input signal has reached a quiescent state.

In some embodiments, the quiescent state may be determined by a user. For example, because the input signal is fixed, the user can easily determine the time at which the input signal reaches a quiescent state (e.g., steady state) and select a sampling point at or after that time. Alternatively, in other embodiments, a component may be configured to provide input signal detection to determine the time at which the input signal reaches a quiescent state and a sampling point may be selected accordingly.

Once a sampling point has been selected, the leakage current associated with the integrated circuit may be calculated using the selected sampling point as described at 205. In some embodiments, a time-domain solution may first be generated by solving a time-domain equation for the integrated circuit at the selected sampling point. This time-domain solution may then be used to solve a non-linear time-independent solution for the integrated circuit to determine the leakage current associated with the integrated circuit. The steps for determining leakage current using a selected sampling point will be discussed in further detail below.

Calculating the leakage current associated with an integrated circuit using a sampling point selected after an input signal for the integrated circuit reaches a quiescent state provides several advantages over prior approaches for determining leakage current. By using a sampling point where the input signal has reached a quiescent state to calculate leakage current rather than modeling an output signal and waiting for the output signal to reach a quiescent state to calculate leakage current, a substantial amount of time can be saved. This is because input signals for an integrated circuit reach a quiescent state at a much earlier point in time than output signals for an integrated circuit. Output signals are generated responsive to input signals (often with some delay) and as such the output signals generally continue to exhibit activity even after the input signals have reached a steady state.

Another advantage gained from calculating leakage current associated with an integrated circuit using a sampling point selected after an input signal for the integrated circuit reaches a quiescent state is predictability. As mentioned above, prior approaches often require a user to determine a time window for which the output signal of the integrated circuit reaches a quiescent state, which is often unreliable and inaccurate. In contrast, determining when an input signal has reached a quiescent state is predictable, reliable, and accurate as the input signal is fixed by a user and as such is very easily ascertained.

Thus, calculating the leakage current associated with an integrated circuit using a sampling point after an input signal for the integrated circuit reaches a quiescent state improves not only the efficiency (e.g., amount of time) of calculating leakage current, but also improves the predictability and accuracy of calculating leakage current.

Figure 3:
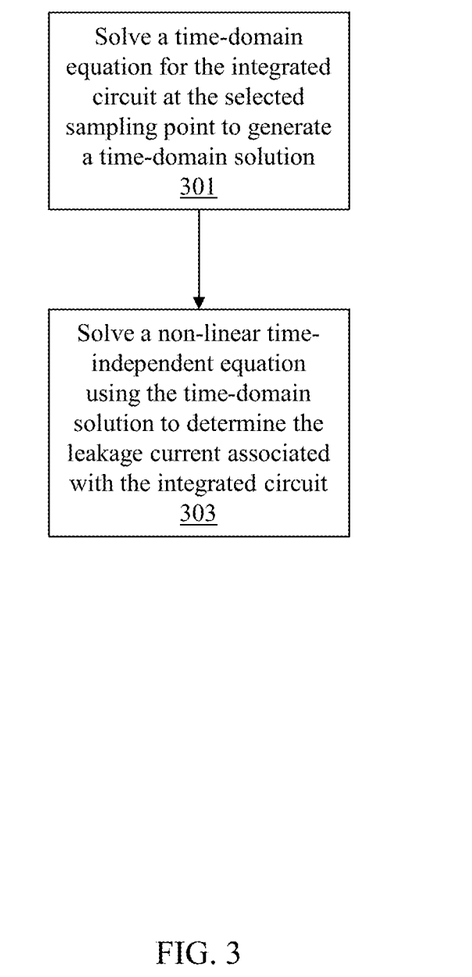
FIG. 3 is a flowchart illustrating a method for calculating leakage current for an integrated circuit using a sampling point at which an input signal is in a quiescent state in accordance with some embodiments.

FIG. 3 is a flowchart illustrating a method for calculating leakage current for an integrated circuit using a sampling point at which an input signal is in a quiescent state in accordance with some embodiments. Once the sampling point has been selected, a time-domain solution for the integrated circuit is generated by solving a time-domain equation for the integrated circuit at the selected sampling point as described at 301.

The time-domain equation describes the relationship between input signals and output signals for a given integrated circuit. One example of a time-domain equation is shown below:

$$i(v(t)) + \frac{d}{dt}q(v(t)) + u(t) = 0$$

$$v(0) = a$$

where v(t) represents the output signal for the integrated circuit, u(t) represents the input signal for the integrated circuit, q(v(t)) represents charges entering nodes from elements such as capacitors, i(v(t)) represents currents entering nodes from resistors, t represents the time and a is an initial condition.

The time-domain equation shown above is solved at the selected sampling point (e.g., point in time in which the input signal for the integrated circuit has reached a quiescent state) to generate a time-domain solution which is used to determine leakage current. The time-domain equation can be solved to generate a time-domain solution using built-in electrical device equations and circuit connectivity information. In some embodiments, the time-domain solution may be generated by discretizing time and computing the solution in a piece-wise manner.

For purposes of example, the time-domain solution to the time-domain equation will be denoted as $v(t_k)$, wherein $t_k$ is the selected sampling point.

The time-domain solution may then be used to solve a non-linear time-independent equation to determine the leakage current associated with the integrated circuit as described at 303. One example of a non-linear time-independent equation is shown below:

$$i(v) + u(t_k) = 0$$

$$v(0) = v(t_k)$$

The solution i(v) of the non-linear time-independent solution corresponds to the leakage current associated with the integrated circuit.

This is in contrast to conventional approaches for determining leakage current. Conventionally, the response (e.g., output signal) of an integrated circuit to an input signal is modeled using a time-domain equation, such as the one described above. The time-domain equation is then solved at different time steps to model the behavior of the integrated circuit. The solution to the time-domain equation at a time-step where the output signal is in a quiescent state corresponds to the leakage current for the integrated circuit.

As discussed above, by using a sampling point where the input signal has reached a quiescent state to calculate leakage current rather than modeling an output signal and waiting for the output signal to reach a quiescent state to calculate leakage current, a substantial amount of time can be saved. Moreover, determining when an input signal has reached a quiescent state is predictable, reliable, and accurate and does not require estimation on the part of the user.

Figure 4:
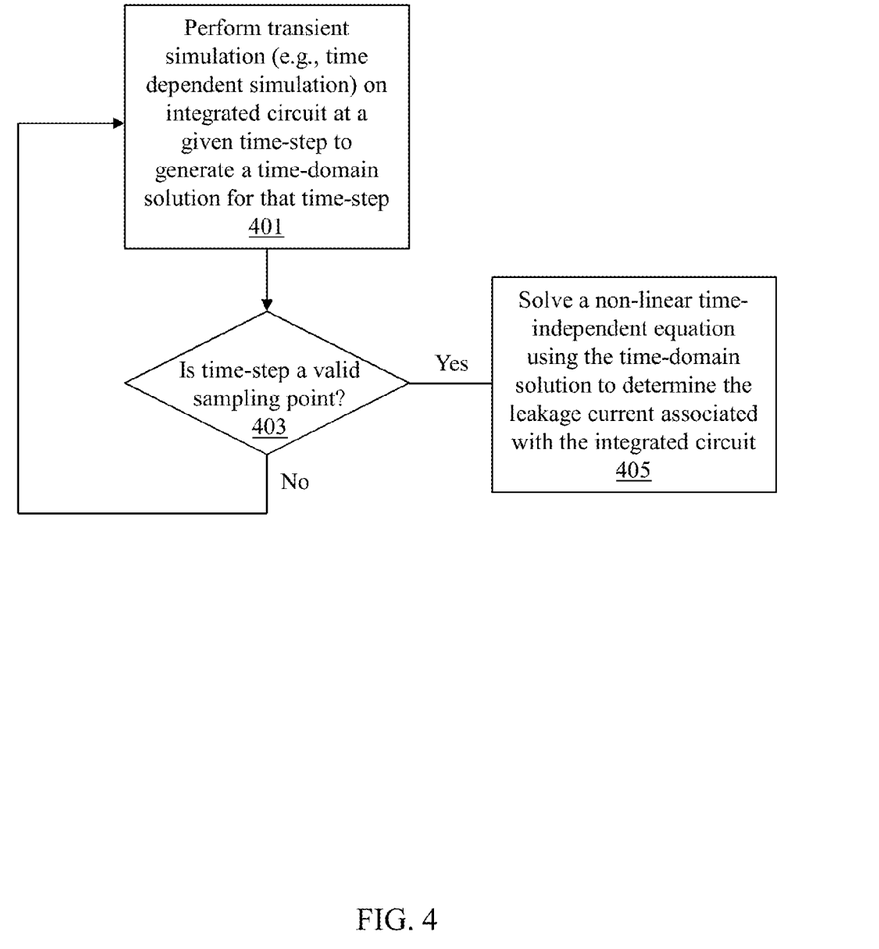
FIG. 4 is a flowchart illustrating one example method for calculating leakage current in accordance with some embodiments.

FIG. 4 is a flowchart illustrating one example method for calculating leakage current in accordance with some embodiments. Initially an integrated circuit is provided with an input signal and a transient simulation is performed on the integrated circuit using the input signal and other circuit parameters to model an output signal for the integrated circuit. The transient simulation is an iterative process that involves solving a time dependent equation at different time-steps to model the output signal for the integrated circuit. For a given time-step, transient analysis is performed on the integrated circuit using the input signal to generate a time-domain solution (e.g., output signal) for that given time-step as described at 401.

A determination is then made as to whether or not the given time-step is a valid sampling point as described at 403. This may be done by simply observing the input signal to determine whether or not it has reached a quiescent state at the given time step.

If the time-step is not a valid sampling point (i.e., input signal has not reached quiescent state at that particular time-step), then the transient simulation continues for the next-time step. If the time-step is a valid sampling point (i.e., input signal has reached quiescent state at that particular time-step), then the time-domain solution generated for that time-step is used to calculate the leakage current for the integrated circuit.

The time-domain solution generated by transient analysis at the given time-step is then used to solve a non-linear time-independent equation as described at 405. The time-domain solution may be used to solve the non-linear time-independent equation in a manner consistent with that described above.

Thus, the leakage current for the integrated circuit can be determined at a point in time at which the input signal has reached a quiescent state rather than having to model the output signal all the way up until it reaches a quiescent state. This improves efficiency, accuracy, and predictability in calculating leakage current for a given integrated circuit.

Figure 5:
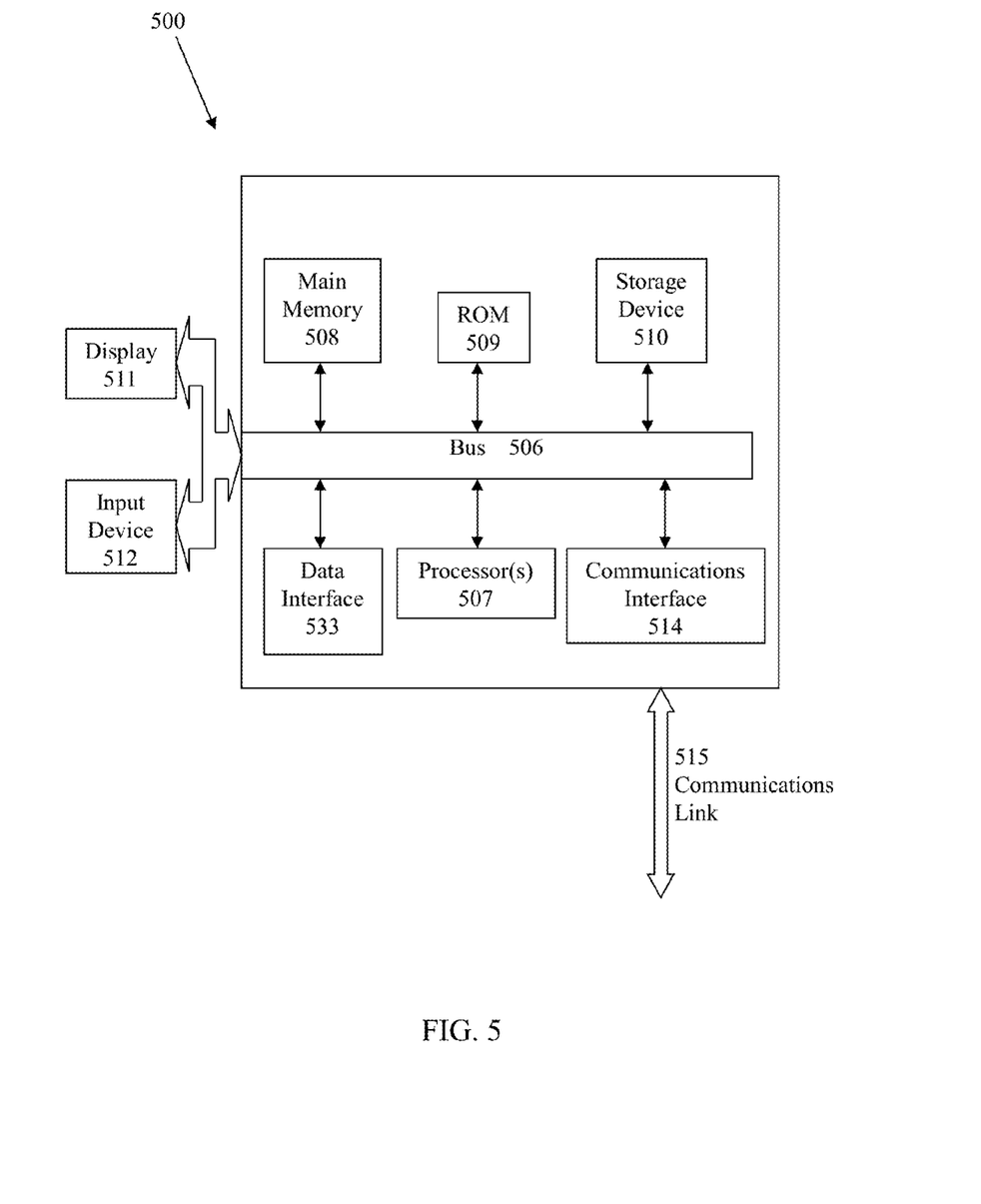
FIG. 5 is a block diagram of an illustrative computing system suitable for implementing an embodiment of the present invention.

FIG. 5 is a block diagram of an illustrative computing system 500 suitable for implementing an embodiment of the present invention. Computer system 500 includes a bus 506 or other communication mechanism for communicating information, which interconnects subsystems and devices, such as processor(s) 507, system memory 508 (e.g., RAM), static storage device 509 (e.g., ROM), disk drive 510 (e.g., magnetic or optical), communication interface 514 (e.g., modem or Ethernet card), display 511 (e.g., CRT or LCD), input device 512 (e.g., keyboard), and cursor control.

According to one embodiment of the invention, computer system 500 performs specific operations by processor(s) 507 executing one or more sequences of one or more instructions contained in system memory 508. Such instructions may be read into system memory 508 from another computer readable/usable medium, such as static storage device 509 or disk drive 510. In alternative embodiments, hard-wired circuitry may be used in place of or in combination with software instructions to implement the invention. Thus, embodiments of the invention are limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor(s) 507 for execution. Such a medium may take many forms, including but not limited to, non-volatile media and volatile media. Non-volatile media includes, for example, optical or magnetic disks, such as disk drive 510. Volatile media includes dynamic memory, such as system memory 508.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 500. According to other embodiments of the invention, two or more computer systems 500 coupled by communication link 515 (e.g., LAN, PTSN, or wireless network) may perform the sequence of instructions required to practice the invention in coordination with one another.

Computer system 500 may transmit and receive messages, data, and instructions, including program, i.e., application code, through communication link 515 and communication interface 514. Received program code may be executed by processor(s) 507 as it is received, and/or stored in disk drive 510, or other non-volatile storage for later execution.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than restrictive sense.

What is claimed is:

1. A method for calculating leakage current associated with an integrated circuit, comprising:
    selecting a sampling point at which an input signal for the integrated circuit is in a quiescent state; and
    determining, using a processor, the leakage current associated with the integrated circuit using the selected sampling point, wherein determining the leakage current comprises:
        solving a time-domain equation for the integrated circuit at the selected sampling point to generate a time-domain solution; and
        solving a non-linear time-independent equation using the time-domain solution to determine the leakage current associated with the integrated circuit.

2. The method of claim 1, wherein the leakage current is determined for a standby mode of operation.

3. The method of claim 1, wherein the leakage current is determined for a retention mode of operation.

4. The method of claim 1, wherein the leakage current is determined for a power-down mode of operation.

5. The method of claim 1, wherein the input signal is associated with a single mode of operation.

6. The method of claim 1, wherein the input signal is associated with a plurality of modes of operation.

7. The method of claim 1, wherein the sampling point is selected by a user.

8. The method of claim 1, wherein the sampling point is automatically selected.

9. The method of claim 1, wherein the sampling point is a first point at which the input signal is in a quiescent state.

10. The method of claim 1, wherein the sampling point is any point in time after the input signal reaches a quiescent state.

11. The method of claim 1, wherein solving the time-domain equation for the integrated circuit at the selected sampling point to generate a time-domain solution comprises performing transient analysis on the integrated circuit at the selected sampling point.

12. The method of claim 1, wherein the method for calculating leakage current is for an integrated circuit design associated with the integrated circuit.

13. A computer program product comprising a non-transitory computer readable medium, wherein the computer readable medium comprises executable program code for implementing a method for calculating leakage current associated with an integrated circuit, the method comprising:
    selecting a sampling point at which an input signal for the integrated circuit is in a quiescent state; and
    determining the leakage current associated with the integrated circuit using the selected sampling point, wherein determining the leakage current comprises:
        solving a time-domain equation for the integrated circuit at the selected sampling point to generate a time-domain solution; and
        solving a non-linear time-independent equation using the time-domain solution to determine the leakage current associated with the integrated circuit.

14. The computer program product of claim 13, wherein the leakage current is determined for a standby mode of operation.

15. The computer program product of claim 13, wherein the leakage current is determined for a retention mode of operation.

16. The computer program product of claim 13, wherein the leakage current is determined for a power-down mode of operation.

17. The computer program product of claim 13, wherein the input signal is associated with a single mode of operation.

18. The computer program product of claim 13, wherein the input signal is associated with a plurality of modes of operation.

19. The computer program product of claim 13, wherein the sampling point is selected by a user.

20. The computer program product of claim 13, wherein the sampling point is automatically selected.

21. The computer program product of claim 13, wherein the sampling point is a first point at which the input signal is in a quiescent state.

22. The computer program product of claim 13, wherein the sampling point is any point in time after the input signal reaches a quiescent state.

23. The computer program product of claim 13, wherein solving the time-domain equation for the integrated circuit at the selected sampling point to generate a time-domain solution comprises performing transient analysis on the integrated circuit at the selected sampling point.

24. The computer program product of claim 13, wherein the method for calculating leakage current is for an integrated circuit design associated with the integrated circuit.

25. A system for calculating leakage current associated with an integrated circuit, comprising:
    a memory that holds executable program code; and
    a processor capable of executing the executable program code, wherein the executable program code comprises code for:
        selecting a sampling point at which an input signal for the integrated circuit is in a quiescent state; and
        determining the leakage current associated with the integrated circuit using the selected sampling point, wherein determining the leakage current comprises:

solving a time-domain equation for the integrated circuit at the selected sampling point to generate a time-domain solution; and solving a non-linear time-independent equation using the time-domain solution to determine the leakage current associated with the integrated circuit.

26. The system of claim 25, wherein the leakage current is determined for a standby mode of operation.

27. The system of claim 25, wherein the leakage current is determined for a retention mode of operation.

28. The system of claim 25, wherein the leakage current is determined for a power-down mode of operation.

29. The system of claim 25, wherein the input signal is associated with a single mode of operation.

30. The system of claim 25, wherein the input signal is associated with a plurality of modes of operation.

31. The system of claim 25, wherein the sampling point is selected by a user.

32. The system of claim 25, wherein the sampling point is automatically selected.

33. The system of claim 25, wherein the sampling point is a first point at which the input signal is in a quiescent state.

34. The system of claim 25, wherein the sampling point is any point in time after the input signal reaches a quiescent state.

35. The system of claim 25, wherein solving the time-domain equation for the integrated circuit at the selected sampling point to generate a time-domain solution comprises performing transient analysis on the integrated circuit at the selected sampling point.

* * * * *